UNITED STATES PATENT OFFICE.

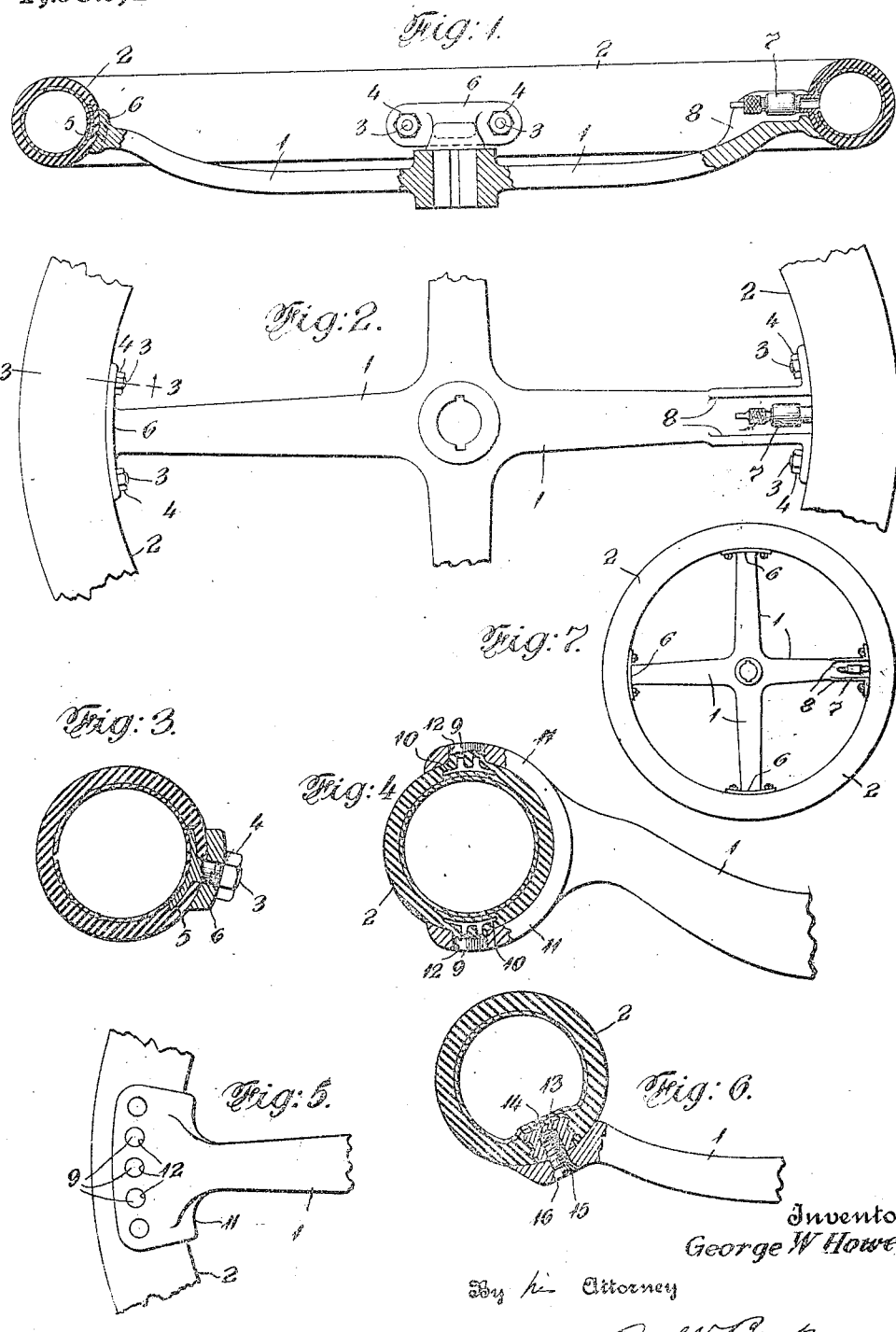

GEORGE W. HOWER, OF NEW YORK, N. Y.

STEERING-WHEEL.

1,262,194.

Specification of Letters Patent.  Patented Apr. 9, 1918.

Application filed May 1, 1917.  Serial No. 165,668.

*To all whom it may concern:*

Be it known that I, GEORGE W. HOWER, a citizen of the United States, and a resident of the borough of Bronx, in the city of New York, county of Bronx, and State of New York, have invented certain new and useful Improvements in Steering-Wheels, of which the following is a specification.

This invention relates to steering wheels of the particular type used in the control of vehicles although it may be used for any other purpose for which it is adapted.

In the steering wheel art as heretofore known considerable difficulty has been experienced in producing wheel rims having a sufficiently substantial and, at the same time, resilient structure to eliminate the pronounced vibration accompanying the use of wheel rims of rigid and unyielding type. This vibration, which is particularly noticeable in the use of the smaller cars, is very troublesome because of its tendency to tire the arms of the operator and, in addition to the discomfort thus caused, to increase the danger of an accident through the driver's diminished power of control. In addition the wood, or composition, rims now in use are generally smooth so that they do not provide a contact surface that can be effectively gripped without undue muscular exertion. The main object of the present invention is to produce a steering wheel that will be free from the objections noted and that will combine in the same device the advantages possessed by the use of means for overcoming vibration and at the same time providing a gripping surface having a relatively high degree of friction.

With this and other objects in view, the invention consists principally in providing a steering wheel with a rim consisting of a pneumatic tube supported only at its points of attachment to the spokes to provide elongated grasping portions between the points of attachment, which will have a sufficient degree of resiliency to substantially prevent transmission of mechanical vibrations from the rigid portions of the steering wheel to the hands of the operator.

Another feature of the invention consists in the provision of means for quickly attaching or detaching the rim from the wheel without the use of tools.

Other features of the invention will be referred to as the description proceeds.

In the accompanying drawing, wherein there is shown a number of the many possible embodiments of the invention:

Figure 1 is a vertical sectional view of a steering wheel embodying the invention.

Fig. 2 is a plan view, partly broken away, of the device shown in Fig. 1.

Fig. 3 is an enlarged section taken along the line 3—3 of Fig. 2 and showing the means used for attaching the pneumatic rim to the spokes of the wheel.

Fig. 4 is a sectional view of a portion of a device showing in detail a modified form of attaching means in which the pneumatic rim is held in place through its own inflation.

Fig. 5 is a plan view of the attaching means shown in Fig. 4.

Fig. 6 is a sectional view in detail of still another form of rim attaching means.

Fig. 7 is a plan view of the steering wheel on a reduced scale and showing the comparative length of the grasping portions of the pneumatic rims.

In the drawing there is shown a number of embodiments of the invention which disclose, in common, a resilient, pneumatic steering-wheel rim, formed preferably of a hollow tube of rubber, or the like, and adapted to be inflated after the manner of a bicycle tire. The pneumatic rim thus formed is substantially made so that it is not necessary to support it except at its points of attachment to the wheel spokes. Since, ordinarily, such spokes are not more than four in number, it will be seen that the points of support are separated by substantial spaces which provide for a high degree of resiliency in the grasping portion of the rim formed by such unsupported spaces sufficient to effectively cushion the vibrations of the wheel and prevent their transmission to the hands of the operator. Preferably the size and shape of any given cross-section of the rim and the nature of the material of which the rim is composed are so combined that the rim can be readily and securely grasped by the hands of the operator at the expenditure of a minimum of muscular effort. Various expedients are shown for securing the rim in place and included among these is a device providing for a ready interchange of rims without the use of tools.

In the embodiment of the invention shown in Figs. 1, 2 and 3 a steering wheel, having the spokes 1, is provided with a pneumatic rim 2 attached to the ends of the spokes 1 by means of the threaded studs 3 and the nuts 4. The studs 3 are preferably integral with a curved plate 5 embedded in the rubber, or other material, of which the pneumatic rim, or tube, 2 is composed. The studs 3 are mounted near the ends of the curved plate so that they project radially outward from the rim 2 in position to enter holes in the corresponding curved plates 6 integral with the ends of the spokes 1. It will be seen that when the studs are locked in place by means of the nuts 4 each pair of studs will take positions in which the ends of the spokes are interposed between the studs.

One of the plates 5 carried by the tube 2 is provided with an ordinary inflation valve 7 through which the pneumatic rim 2 can be inflated. In order to prevent injury to the inflation valve, means are preferably provided which will tend to shield the valve from the effects of accidental blows which might otherwise tend to injure it. This protecting, or shielding, means takes the form of guard members 8 projecting upwardly from the end of one of the spokes and spaced apart so as to form a channel in which the valve 7 is protected against injury.

In Figs. 4 and 5 of the drawing there is shown a form of attaching means which provides for the ready attachment, or detachment, of the pneumatic rim from its position in engagement with the ends of the wheel spokes 1. In this form of the invention, in place of the threaded studs 3 which were employed in connection with the device shown in Fig. 1, lugs 9 are formed integrally with the pneumatic rim itself and project radially therefrom on diametrically opposite sides thereof. These lugs 9, as has been stated, are formed of rubber or such other material as is used in the construction of the rim 2 and are preferably reinforced by means of the metal reinforcing members 10 embedded in the rim 2 itself.

In order to utilize the lugs 9 in attaching the pneumatic rim 2 to the wheel, the spokes 1 in this modification are preferably provided at their ends with jaw-like members 11 which are adapted to fit over and hold the pneumatic rim 2. The members 11 are provided with holes 12 corresponding in number and arrangement to the number and arrangement of the lugs 9 projecting from the rim 2. With this construction it will be seen that it is a very simple matter to attach a pneumatic rim 2 to the spokes 1, since it is necessary merely to deflate the rim and place it in position in the socket formed by the members 11 with the lugs 9 coincident with the openings 12 in the members 11 and then to inflate the rim. The distention of the rim as the air is pumped into it through the inflation valve 7 causes the lugs 9 to be pressed into position within the holes 12 and to thereby lock the pneumatic rim firmly in place. On the other hand the removal of the rim from its place is just as simple, since the mere act of deflation permits the ready removal of the lugs 9 from the holes 12 and the consequent easy removal of the rim from its engagement with the spokes 1.

Still another form of means for attaching the rim to the spokes is shown in Fig. 6 of the drawing. This modification differs from that shown in Fig. 1 in that the relation of the locking members is reversed resulting in a construction in which the locking parts lie flush with the face of the spoke itself so that no projections are formed which are likely to injure the hands of the operator. Instead of a curved plate with a threaded lug projecting therefrom, in this form of the invention a socket member 13 is embedded in the material of which the rim 2 is composed and is provided with a threaded opening 14 in which a machine screw 15 having a countersunk head is adapted to be engaged. The screw 15 passes through openings 16 provided for the purpose in the outer ends of the spokes 1.

In Fig. 7 is shown on a reduced scale a plan view of a complete wheel embodying the invention. It will be seen that the grasping portions 17 of the rim 2 are of such comparatively great length that they will provide a sufficient degree of resiliency to effectively prevent the transmission of mechanical vibrations from the rigid part of the wheel to the arms of the operator.

I claim:

A steering-wheel rim comprising: a pneumatic tube having exposed non-rigid grasping portions, and circumferentially interrupted rigid supporting means connected to the grasping portions whereby mechanical vibrations of the supporting means are prevented from being transmitted to the hands of the operator.

Signed at New York city, in the county of New York and State of New York, this 23rd day of April, 1917.

G. W. HOWER.